I. S. MERRELL.
APPARATUS FOR TREATING DRIED FRUIT.
APPLICATION FILED NOV. 20, 1905.
969,969.
Patented Sept. 13, 1910.
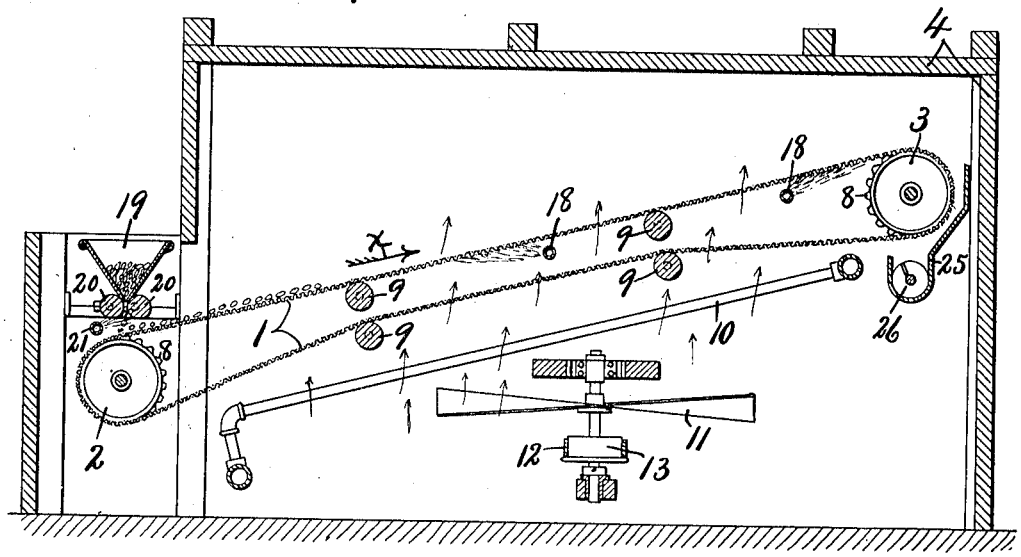
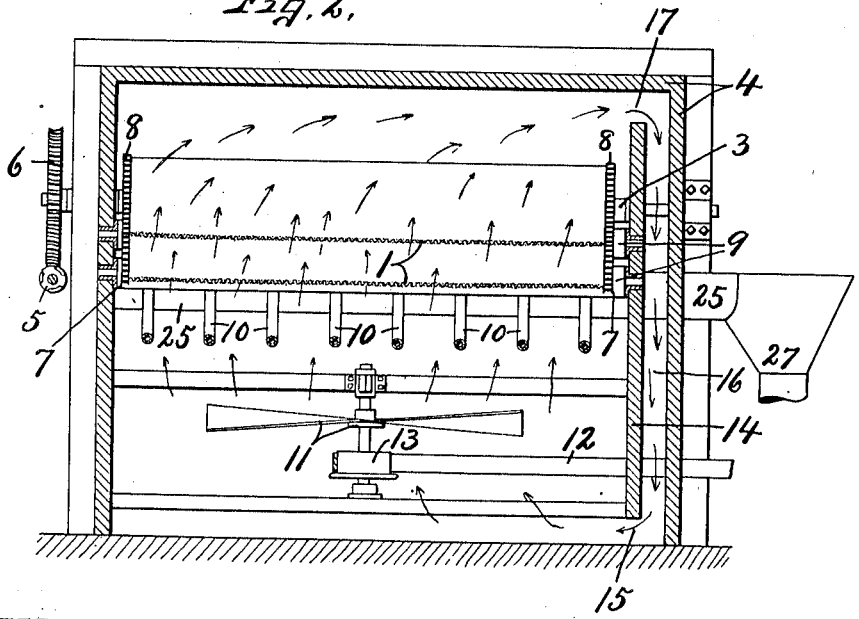
WITNESSES:
INVENTOR:
Irving S. Merrell
BY:
Howard P. Denison
ATTORNEY.

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

APPARATUS FOR TREATING DRIED FRUIT.

969,969.  Specification of Letters Patent.  Patented Sept. 13, 1910.

Application filed November 20, 1905. Serial No. 288,217.

*To all whom it may concern:*

Be it known that I, IRVING S. MERRELL, of Syracuse, in the county of Onondaga, in the State of New York, have invented new and useful Improvements in Apparatus for Treating Dried Fruits, of which the following, taken in connection with the accompanying drawings, is a full, clear, and exact description.

This invention relates to certain improvements in apparatus for treating dried fruit and refers more particularly to a device for softening dried raisins preparatory to seeding the same.

The broad object is to convey the dried fruit in a comparatively thin layer through a continuously circulating heating agent, such as heated moisture-laden air, steam, or air and steam which is forcibly driven through such layer so as to envelop and soften the dried units while in transit from the supply hopper to the seeder.

A more specific object is to distribute the dried fruit (as raisins) over the surface of a comparatively broad continuously moving foraminous conveyer and to circulate the humid vapor from the underside upwardly through such conveyer and fruit thereon so as to render the softening process continuous, automatic and expeditious.

In the drawings Figures 1 and 2 are respectively a longitudinal and a transverse vertical sectional view of an apparatus embodying the features of my invention.

The apparatus shown is used specifically in connection with a raisin seeding machine and consists essentially of a flat foraminous conveyer belt—1— preferably of light flexible wire fabric which is mounted upon rotary supporting drums 2 and 3 within a closed housing —4— and is driven at a comparatively slow speed in the direction indicated by arrow —*x*— by a worm —5— and gear —6—. The front portion of the conveyer extends from and some distance beyond the front side of the housing to receive the fruit from a suitable feeding device and permit such fruit to be steamed before entering the housing, the remaining portion of said conveyer being located wholly within such housing. The opposite longitudinal edges of this foraminous belt are attached to endless chains —7— which are engaged with sprocket wheels—8— on the ends of the drums —2 and 3— for imparting positive motion to the belt —1— and drum —3—, said belt being inclined slightly from front to rear and having the intermediate portions of its upper and lower sides supported upon suitable idlers —9— to prevent undue sag thereof. A series of steam heated pipes —10—, are arranged within the housing —4— directly beneath and practically co-extensive with the area of the lower side of the foraminous conveyer —1—, and directly beneath these pipes —10— is located a fan —11— which is driven by a belt —12— and pulley —13— from any available source of power not shown. The interior of the housing —4— is divided longitudinally near one side by a partition —14— which is spaced apart from the adjacent side, top and bottom of said housing forming circulating passages —15, 16 and 17— for the return of the heating fluent after being forced upwardly between the heating pipes —10— and through the foraminous conveyer —1— by the fan —11.

Steam is preferably liberated within the housing —4— through transverse steam pipes —18— each having a series of comparatively small apertures discharging somewhat tangentially against and upwardly through the foramina of conveyer —1— so as to practically envelop, moisten and soften the dried units which are distributed in a thin layer upon the upper surface of said conveyer. The cool dry fruit, as raisins, is placed in a suitable hopper —19— directly over the front or low end of the conveyer —1— and is spread out transversely and fed downwardly and continuously in limited quantities by eccentric rollers —20— which on account of their eccentric motion shift the discharge passage back and forth so as to facilitate the feed and even distribution of the fruit upon the conveyer. The feed rollers —20— are located outside of the housing and some distance above the adjacent portion of the conveyer, and, just above the front end of the conveyer in front of the discharge opening of the hopper and also outside of the housing is located an additional steam pipe —21— having lateral apertures for discharging steam through the falling dried fruit from the rollers 20 to partially moisten and soften the same before entering the housing. This dried fruit falling upon the conveyer from the hopper —19— though slightly heated and moistened by the steam from the pipe —21— is still comparatively cool and in this condition is carried forwardly and upwardly into the housing and through the volume of heated air and steam therein such air and steam being forcibly driven or circulated from the underside upward through the foraminous conveyer and fruit thereon. This circulation is practically co-extensive with and upwardly through the entire area of the belt and therefore causes the moisture laden vapor to come in contact with and to envelop all of the fruit units of the entire layer while in transit from the supply hopper to the place of discharge from the conveyer to the seeding machine.

The speed of travel and length of the conveyer and also the degree of moisture and temperature of the circulating fluent are regulated so as to enable the fruit to attain the desired soft condition while in continuous transit through the housing from the source of supply to the place of discharge from the conveyer and it is found that the efficient working of the apparatus is materially expedited by the use of the fan —11— which keeps the moisture laden air in continuous circulation from the bottom upward through the foraminous conveyer and fruit thereon and return through the passage —16— at one side of said conveyer, said passage —16— forming a by-pass communicating with the interior of the housing at points above and below the conveyer.

It is now obvious that the dried fruit which is considerably cooler than the heated vapor causes more or less condensation of the moisture which may have been held in suspension and this moisture in the form of a fine mist settles upon the raisins and further expedites the softening process, it being apparent that by housing the steam discharge pipes in the manner described the same circulating air laden with moisture is kept in continuous circulation through the foraminous conveyer by the fan —11—.

As the fruit, (as raisins) is carried forwardly by the conveyer —1— to the rear side of the drum —3— it is precipitated by gravity into an underlying trough or hopper —25— in which is located a screw conveyer —26— for feeding the softened raisins to any suitable seeding machine as —27— a portion of which is shown in Fig. 2, The foregoing description taken in connection with the drawings is believed to be sufficiently clear to enable anyone skilled in the art to construct and operate the machine and while I have described steam and air as the heated softening agent it is evident that some dried fruits may be softened by heated air, by steam alone, or by some other fluent either under forced or natural circulation.

What I claim is:—

1. In an apparatus for treating dried fruit, a housing, a continuously traveling foraminous conveyer within and extending outwardly through an opening in one side of said housing, means at the exterior of the housing for feeding fruit on to the exterior portion of the conveyer, means for steaming the fruit in its passage from said feeding means on to the conveyer, and additional means for moistening the fruit while in transit through the housing on the conveyer.

2. In combination with a closed housing having a return passage for moisture laden air in one side, a continuously moving foraminous conveyer extending into the housing, and mechanical means for continuously circulating such moisture laden air through the conveyer and through said passage.

3. In combination with a housing, an endless foraminous conveyer extending into the housing, means for introducing steam into the housing below the conveyer, a partition between one side but spaced apart from the top and bottom of the housing forming a return passage for moisture laden air, and mechanism for circulating moisture laden air through the conveyer and through said return passage.

In witness whereof I have hereunto set my hand on this 16th day of Nov., 1905.

IRVING S. MERRELL.

Witnesses:
J. M. HAMMEKEN,
HOWARD P. DENISON.